US012700750B2

(12) United States Patent
Shah et al.

(10) Patent No.: US 12,700,750 B2
(45) Date of Patent: Aug. 4, 2026

(54) CURRENT SPIKE REDUCTION IN BATTERY CHARGING DEVICES

(71) Applicant: Renesas Electronics America Inc., Milpitas, CA (US)

(72) Inventors: Mehul Dilip Shah, Cary, NC (US); Sivaprakash Kannan, Cary, NC (US); Yang Li, Fremont, CA (US); Xiwen Zhang, Cary, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 1097 days.

(21) Appl. No.: 17/727,189

(22) Filed: Apr. 22, 2022

(65) Prior Publication Data
US 2023/0121953 A1 Apr. 20, 2023

Related U.S. Application Data

(60) Provisional application No. 63/256,177, filed on Oct. 15, 2021.

(51) Int. Cl.
*H02J 7/00* (2026.01)
*H02J 7/62* (2026.01)
*H02J 7/96* (2026.01)

(52) U.S. Cl.
CPC . *H02J 7/96* (2026.01); *H02J 7/62* (2026.01)

(58) Field of Classification Search
USPC ......................................................... 320/137
See application file for complete search history.

(56) References Cited

U.S. PATENT DOCUMENTS

| | | | | |
|---|---|---|---|---|
| 5,994,875 A * | 11/1999 | Lee | ..................... | H02J 7/00712 320/132 |
| 11,218,016 B2 * | 1/2022 | Ha | ............................ | H02J 7/04 |
| 2005/0140333 A1 * | 6/2005 | Chou | ................... | H02J 7/00711 320/116 |
| 2007/0182375 A1 * | 8/2007 | Lee | ............................ | H02J 7/00 320/130 |
| 2008/0238356 A1 * | 10/2008 | Batson | ..................... | H02J 7/04 320/103 |

* cited by examiner

*Primary Examiner* — Samuel Berhanu
(74) *Attorney, Agent, or Firm* — SCULLY, SCOTT, MURPHY & PRESSER, P.C.

(57) ABSTRACT

Apparatuses and methods for regulating a system rail voltage of a battery charger is described. An integrated circuit can be configured to detect a condition that requires an activation of a trickle charge mode of a battery charger. The integrated circuit can, in response to the detection, set a reference voltage to an intermediate voltage level. The reference voltage can control a system rail voltage of the battery charger, and the intermediate voltage level can be greater than a minimum of the system rail voltage. The integrated circuit can reduce the reference voltage from the intermediate voltage level to the minimum system rail voltage to regulate the system rail voltage at a predefined rate.

18 Claims, 5 Drawing Sheets

400

402
Detect a condition that requires an activation of a trickle charge mode of a battery charger 404
In response to the detection, set a reference voltage to an intermediate voltage level 406
Reduce the reference voltage from the intermediate voltage level to the minimum system rail voltage to regulate the system rail voltage at a predefined rate.

CURRENT SPIKE REDUCTION IN BATTERY CHARGING DEVICES

CROSS-REFERENCE TO RELATED APPLICATION

This application claims the benefit of U.S. Provisional Application No. 63/256,177 filed on Oct. 15, 2021. The entire content of U.S. Provisional Application No. 63/256, 177 is incorporated herein by reference.

BACKGROUND OF THE SPECIFICATION

The present disclosure relates in general to integrated circuit devices and, more particularly, to reducing current spike to batteries in battery charging devices.

Battery chargers can be configured to charge a battery as quickly and as safely as possible. However, charging a battery too fast can lead to overcharging conditions that can damage the battery, reduce its performance capacity, shorten its life cycle and may invoke hazardous conditions (e.g., catching fire). To prevent damages to batteries, some battery chargers can be configured to operate under a trickle charge mode. Trickle charge mode can charge a battery relatively slowly over a period of time to prevent damaging the battery.

SUMMARY

In an embodiment, an apparatus for regulating a system rail voltage of a battery charger is generally described. The apparatus can include an integrated circuit configured to detect a condition that requires an activation of a trickle charge mode of a battery charger. The integrated circuit can be further configured to, in response to the detection, set a reference voltage to an intermediate voltage level. The reference voltage can control a system rail voltage of the battery charger, and the intermediate voltage level can be greater than a minimum of the system rail voltage. The integrated circuit can be further configured to reduce the reference voltage from the intermediate voltage level to the minimum system rail voltage to regulate the system rail voltage at a predefined rate.

In another embodiment, a system for regulating a system rail voltage of a battery charger is generally described. The system can include a power stage and a battery charging module connected to the power stage. The battery charging module can include a controller configured to control the power stage to output a system rail voltage. The controller can be further configured to detect a condition that requires an activation of a trickle charge mode of battery charging module. The controller can be further configured to, in response to the detection, set a reference voltage to an intermediate voltage level. The reference voltage can control the system rail voltage of the battery charging module, and the intermediate voltage level can be greater than a minimum of the system rail voltage. The controller can be further configured to reduce the reference voltage from the intermediate voltage level to the minimum system rail voltage to regulate the system rail voltage at a predefined rate.

In another embodiment, a method for regulating a system rail voltage of a battery charger is generally described. The method can include detecting a condition that requires an activation of a trickle charge mode of a battery charger. The method can further include, in response to the detection, setting a reference voltage to an intermediate voltage level. The reference voltage can control a system rail voltage of the battery charger, and the intermediate voltage level can be greater than a minimum of the system rail voltage. The method can further include reducing the reference voltage from the intermediate voltage level to the minimum system rail voltage to regulate the system rail voltage at a predefined rate.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

A battery charger can monitor a battery voltage of a battery being charged. In an aspect, if the battery voltage is below a predefined voltage threshold (e.g., a minimum system rail voltage) for powering a load, the battery charger can operate in trickle charge mode to slowly charge the battery in order to bring the battery voltage above the predefined voltage threshold. After the battery voltage reaches the predefined voltage threshold, the battery charger can charge the battery in a constant current (CC) mode. As the battery voltage passes another threshold, such as a near-fully charged threshold, the battery charger can operate in a constant voltage (CV) mode.

To activate trickle charge mode in the battery charger, a voltage being apply to a gate terminal of a switching element, such as a field-effect transistor (FET), can be adjusted (e.g., reduced) to slow down current flowing to the battery. The adjustment may require a relatively significant reduction of a system rail voltage of the battery charger, and the reduction can incur excessive current spike to the battery, therefore increasing a risk of damaging the battery.

Figure 1:
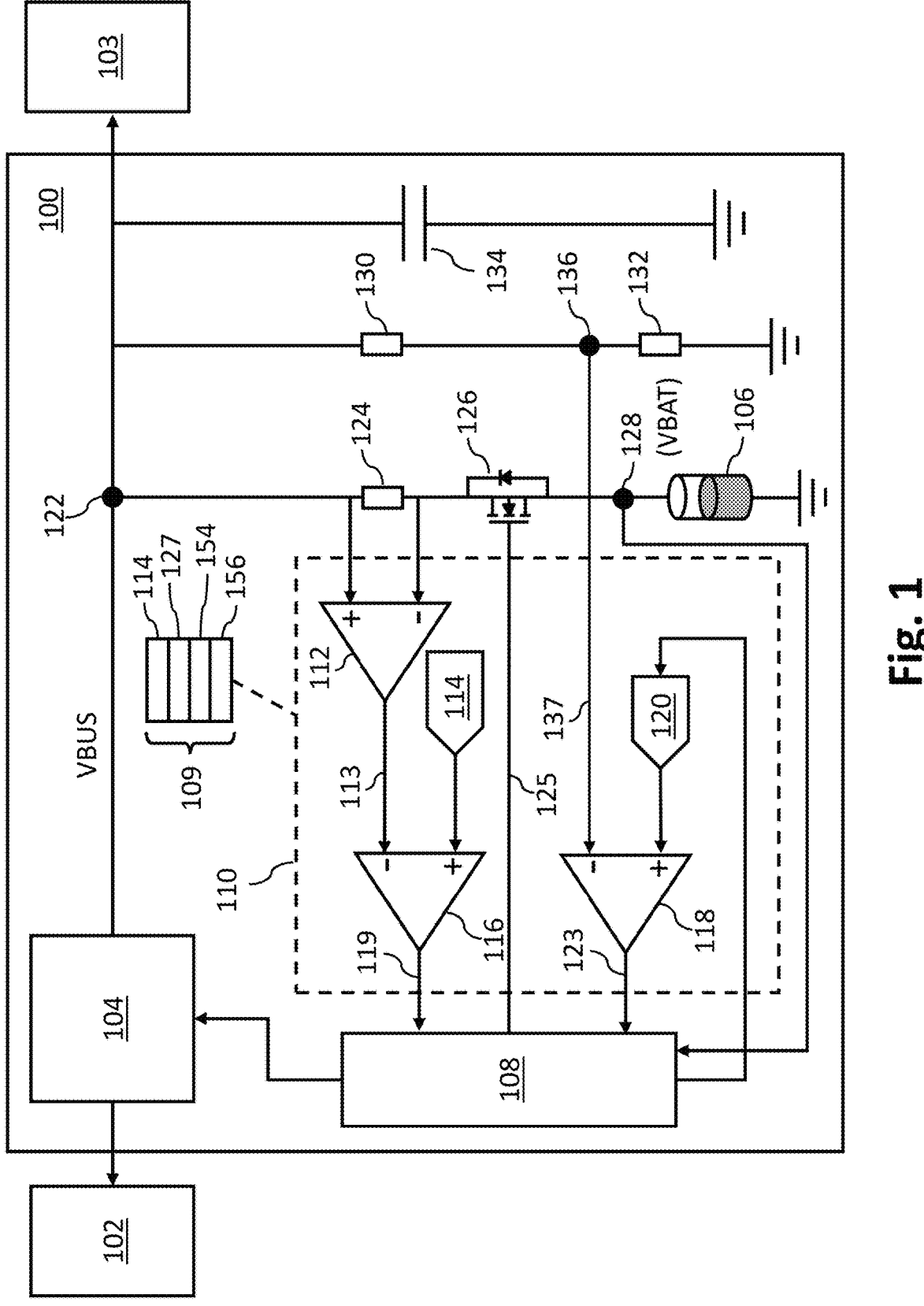
FIG. 1 is a block diagram of an example system for current spike reduction in battery charging devices in one embodiment.

FIG. 1 is a block diagram of an example system 100 for current spike reduction in battery charging devices in one embodiment. System 100 can include a power stage 104, a battery 106, a controller 108 and an integrated circuit 110. In one embodiment, controller 108 can be a microcontroller. In one embodiment, system 100 can be implemented in a battery charging apparatus, such as a battery charger for a detachable battery, or a portable electronic device, that can be connected to an adapter 102 to enable charging of a battery 106. Controller 108 and integrated circuit 110 can form a battery charging module of the battery charging apparatus. Integrated circuit 110 can be a trickle charge circuit block including circuit components that allow system 100 to operate under trickle charge mode. Power stage 104 can include a power converter, such as a buck converter or other types of DC-DC converter, that can be driven by controller 108 to generate and output a system rail voltage (labeled as VBUS). VBUS can be measured at a node 122 and can be voltage being outputted to a load 103. System 100 can further include a capacitor 134, where capacitor 134 can be charged by the system rail voltage VBUS.

System 100 can further include a resistor 124 and a switching element, such as a field effect transistor (FET) 126. In response to FET 126 being switched on, battery 106 can be connected to node 122 and current can be drawn by load 103 from battery 106. Further, in response to FET 126 being switched on and system 100 being connected to adapter 102, controller 108 can activate a charging mode to cause current to flow from node 122 to battery 106 through resistor 124 to charge battery 106. Some examples of charging modes can include trickle charge mode, constant current (CC) mode, constant voltage (CV) mode, etc.

Integrated circuit 110 can include an amplifier 112, an amplifier 116, and an amplifier 118. A first terminal of resistor 124 can be connected to node 122 and to an inverting input terminal of amplifier 112. A second terminal of resistor 124 can be connected to a non-inverting input terminal of amplifier 112.

Amplifier 112 and amplifier 116 can form a trickle charge current loop that monitors current flowing through resistor 124 during trickle charge mode. Amplifier 112 can be an amplifier configured to sense current flowing through resistor 124 by measuring a voltage 113 being developed across resistor 124. Voltage 113 measured by amplifier 112 can be outputted to an inverting input terminal of amplifier 116. In one embodiment, system 100 can include a set of storage elements 109, where storage elements 109 can be, for example, memory devices such as random-access memory (RAM) devices or a set of register files. A trickle charge reference voltage 114 can be stored in storage elements 109. Controller 108 can be configured to retrieve trickle charge reference voltage 114 from storage elements 109, where trickle charge reference voltage 114 can be a voltage level that can generate a trickle charge current necessary for system 100 to operate under trickle charge mode. Controller 108 can provide trickle charge reference voltage 114 to a non-inverting input terminal of amplifier 116. In one embodiment, a digital to analog converter (DAC) can be connected to the non-inverting input terminal of amplifier 116 and a digital signal representing trickle charge reference voltage 114 can be store in storage elements 109. Controller 108 can retrieve the digital value and input the digital value into the DAC and the DAC can convert the digital value into trickle charge reference voltage 114.

Amplifier 116 can compare voltage 113 with trickle charge reference voltage 114 and output a result of the comparison as a difference voltage 119. Controller 108 can receive difference voltage 119 from amplifier 116. During trickle charge mode, a voltage level of difference voltage 119 can indicate whether trickle charge current flowing from node 122 to battery 106 is deviating from the trickle charge reference voltage 114 or not. If difference voltage 119 indicates deviation, controller 108 can control power stage 104 to adjust VBUS and the adjustment to VBUS can adjust the amount of current flowing from node 122 to battery 106 as well.

Amplifier 118 can be a VBUS regulation loop that monitors VBUS and regulate VBUS based on the monitoring. In one embodiment, system 100 can further include a voltage divider formed by a resistor 130 and a resistor 132. The voltage divider can output a voltage 137 from a node 136 to an inverting input terminal of amplifier 118. Voltage 137 can represent a scaled version of VBUS, where the scaled factor can be based on the resistance of the resistors 130, 132. For example, if VBUS is 12.28 volts (V), and the voltage divider formed by resistors 130, 132 divide VBUS by six, then voltage 137 will be 2.046V.

Controller 108 can be configured to set a value of a reference voltage 120 being inputted into a non-inverting input terminal of amplifier 118. For example, controller 108 can retrieve a digital value among different digital values stored in storage elements 109 and input the retrieved digital value to a DAC connected to the non-inverting input terminal of amplifier 118. Controller 108 can also tune reference voltage 120, instead of setting reference voltage 120 to a new value. In one embodiment, controller 108 can scale down reference voltage 120 based on the voltage divider formed by resistors 130, 132. For example, if the voltage divider formed by resistors 130, 132 divides VBUS by six, then controller 108 can divide reference voltage 120 by six as well. In an example, if reference voltage 120 is a minimum system rail voltage 127, or minVsys 127, having a voltage level of 9.216V, then controller 108 can divide 9.216V by six and set or update reference voltage 120 to be 1.536V.

In one embodiment, amplifier 118 can be a transconductance amplifier 118 configured to output a current 123 proportional to its differential input voltages, such as voltage 137 and reference voltage 120. Current 123 can be a product of transconductance of amplifier 118 and a difference between voltage 137 and reference voltage 120. Controller 108 can receive current 123 from amplifier 118, and controller 108 can use current 123 to control power stage 104 to adjust VBUS. For example, controller 108 can use current 123 to determine a difference between voltage 137 and reference voltage 120, and the determined difference can indicate an amount of adjustment needed to VBUS in order to regulate VBUS to match reference voltage 120. Controller 108 can receive current 123 from amplifier 118, and controller 108 can also use current 123 to generate a drive signal 125. Controller 108 can use drive signal 125 to drive or to control a gate of FET 126. Different voltage levels of drive signal 125 can control FET 126 to be switched on, switched off, operate in ohmic or linear region, operate in saturation region, etc. In one embodiment, FET 126 can be a N-type FET such that an increase in the voltage level of drive signal 125 can increase the amount of current flowing through FET 126.

In one embodiment, when system 100 is charging battery 106 under a mode other than trickle charge mode (e.g., under constant current mode or constant voltage mode), controller 108 can control power stage 104 to output VBUS at a default voltage level. In one embodiment, the default voltage level of VBUS can be a maximum system rail voltage, or max Vsys, and a default voltage level of reference voltage 120 can be minVsys 127. The difference between max Vsys and min Vsys 127 being inputted to amplifier 118 can allow drive signal 125 to maintain a voltage level that sufficiently switches on FET 126 to allows current to flow through FET 126.

In one embodiment, controller 108 can monitor a battery voltage VBAT of battery 106 at a node 128. In response to VBAT being less than a voltage threshold, such as minVsys 127, controller 108 can activate trickle charge mode to charge battery 106 at a slower rate. Trickle charge mode requires a smaller amount of current to flow into battery 106 in order to charge battery 106 at a slower rate when compared to other modes (e.g., CC mode). To slow down the current flowing to battery 106, controller 108 can adjust (e.g., reduce) the voltage level of drive signal 125 to cause less current to flow through FET 126. In an aspect, reducing the voltage level of drive signal 125 to a level that drives FET 126 in linear region can slow down the current flowing to battery 106 under trickle charge mode. To adjust drive signal 125, the difference between voltage 137 and reference voltage 120 needs to be reduced (e.g., reducing current 123). In order to reduce the difference between voltage 137 and reference voltage 120, controller 108 can control power stage 104 to reduce VBUS. If VBUS is reduced directly, or quickly, to match reference voltage 120 (e.g., causing current 123 to be zero or close to zero), an excessive current spike can flow to battery 106. For example, a direct change of VBUS from a default or max Vsys (e.g., 12.28V) to a minVsys 127 (e.g., 9.216V) can cause a relatively rapid voltage level drop in VBUS. The quick voltage drop in VBUS can cause capacitor 134 to discharge quickly as well, and the quick discharge can create a current spike into battery 106. Excessive current spike flowing to battery 106 can damage battery 106 and reduce a battery life of battery 106.

In order to reduce a risk of damaging battery 106 and in order to prolong the battery life of battery 106, controller 108 can regulate a rate of change, or rate of reduction, of VBUS. For example, in response to a need to activate trickle charge mode, controller 108 can set reference voltage 120 to an intermediate voltage 154 (e.g., instead of minVsys 127). In one embodiment, intermediate voltage 154 can be a voltage between maxVsys and minVsys 127. In one embodiment, intermediate voltage 154 can be maxVsys. Controller 108 can continue to set reference voltage 120 to other intermediate voltages between maxVsys and minVsys, in a decreasing voltage level order, until reference voltage 120 is set to minVsys 127. In one embodiment, intermediate voltage 154 can be close to the max Vsys, such as within X % (e.g., 3%, 5%, etc.) of the max Vsys. In another embodiment, controller 108 can set reference voltage 120 to be max Vsys in response to a need to activate trickle charge mode. The gradual regulation of VBUS from maxVsys or intermediate voltage 154 to minVsys 127 can reduce the difference between voltage 137 and reference voltage 120 gradually and reduce current spike going into battery 106.

In one or more embodiments, under a steps control approach, controller 108 can set reference voltage 120 iteratively by selecting different intermediate voltages between max Vsys and minVsys 127 from storage elements 109, in a decreasing order, until reference voltage 120 is minVsys 127. In an example where max Vsys is 12.28V and minVsys is 9.216V, controller 108 can first select 11.98V (e.g., intermediate voltage 154), then select 11.276V, then 10.25V, then 9.216V (e.g., minVsys 127). This iterative selection by controller 108 can reduce VBUS in a step-wise approach and reduce current spike going into battery 106.

Under a slew rate control approach, controller 108 can reduce reference voltage 120 using linear control or resistor-capacitor (RC) circuit control. In an example where max Vsys is 12.28V and min Vsys is 9.216V, controller 108 can set reference voltage 120 to 11.98V, then apply a filter, such as a linear filter or a RC filter, before the non-inverting input terminal of amplifier 118 to gradually tune reference voltage 120 from 11.98V to 9.216V. In one embodiment, a pre-defined slew rate 156 can be stored in storage elements 109. Predefined slew rate 156 can define an allowed duration of time to tune reference voltage 120 from intermediate voltage 154 to minVsys 127. Controller 108 can configure the filter being used for the slew rate approach using predefined slew rate 156. For example, controller 108 can be configured to adjust filter coefficients of filters being used for tuning reference voltage 120.

Figures 2A, 2B:
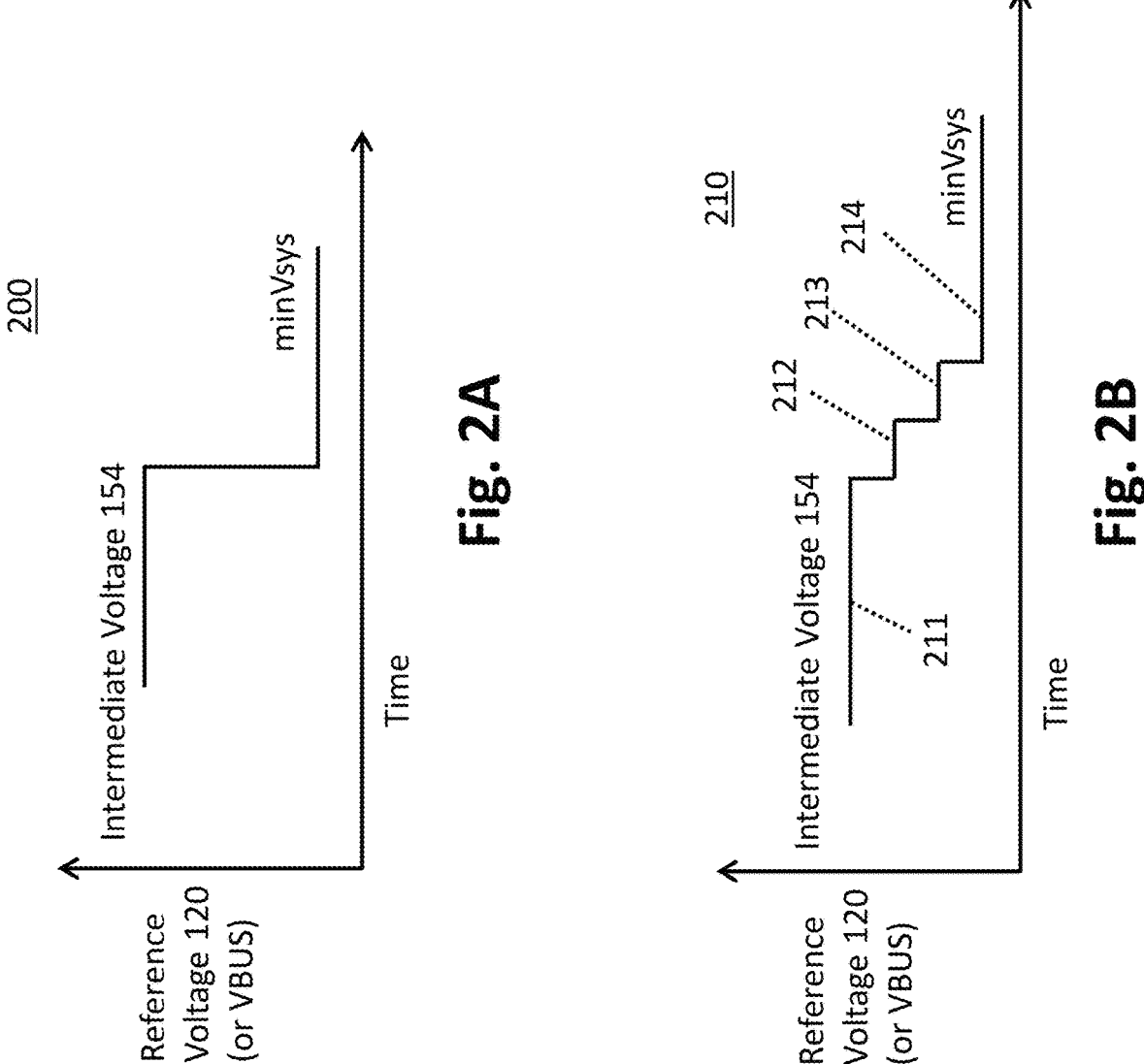
FIG. 2A is a diagram illustrating an example step control that can be performed in an implementation of current spike reduction in battery charging devices in one embodiment.
FIG. 2B is a diagram illustrating another example step control that can be performed in an implementation of current spike reduction in battery charging devices in one embodiment.

FIG. 2A and FIG. 2B are diagrams illustrating examples of step control that can be performed in an implementation of current spike reduction in battery charging devices in one embodiment. Under a single step control 200 shown in FIG. 2A, in response to a need to activate trickle charge mode, controller 108 can set reference voltage 120 to intermediate voltage 154, then perform one reduction step by changing reference voltage 120 to minVsys 127. In one embodiment, under single step control 200, controller 108 may select an intermediate voltage that may be approximately midway between max Vsys and minVsys 127 to reduce current spike going to battery 106. For example, instead of first setting reference voltage 120 to 11.98V, controller 108 can first set reference voltage 120 to be 10.748V to regulate VBUS to 10.748, then preform one reduction step by setting reference voltage 120 to min Vsys.

Under a multi-step control 210 shown in FIG. 2B, in response to a need to activate trickle charge mode, controller 108 can set reference voltage 120 to intermediate voltage 154, then perform multiple reduction steps by iteratively changing reference voltage 120 to other intermediate voltages between max Vsys and minVsys 127, until reference voltage 120 is set to minVsys. For example, a first selection 211 of 11.98V can set reference voltage 120 to 11.98V. Based on the first selection 211, controller 108 can regulate VBUS to 11.98V. A second selection 212 can set reference voltage 120 to 11.276V. Based on the second selection 212, controller 108 can regulate VBUS from 11.98V to 11.276V. A third selection 213 can set reference voltage 120 to 10.25V. Based on the third selection, controller 108 can regulate VBUS from 11.276V to 10.25V. A fourth selection 214 can set reference voltage 120 to 9.216V. Based on the fourth selection, controller 108 can regulate VBUS from 10.25V to 9.216V. The fourth selection 214 is the last selection since VBUS is regulated to 9.216V and reference voltage 120 is set to minVsys 127 upon performing the fourth selection.

Figures 2C, 2D:
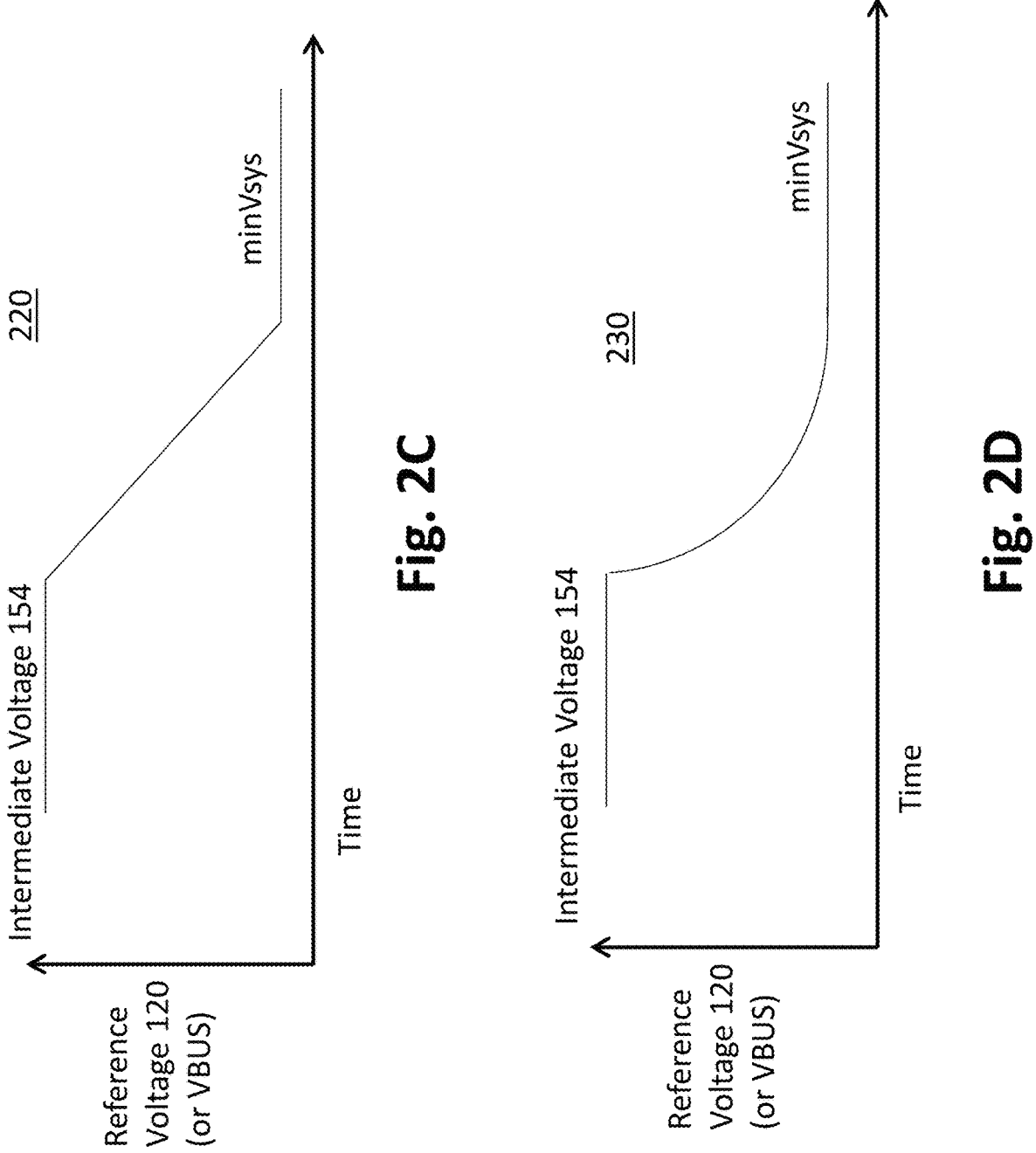
FIG. 2C is a diagram illustrating an example slew rate control that can be performed in an implementation of current spike reduction in battery charging devices in one embodiment.
FIG. 2D is a diagram illustrating another example slew rate control that can be performed in an implementation of current spike reduction in battery charging devices in one embodiment.

FIG. 2C and FIG. 2D are diagrams illustrating examples slew rate control that can be performed in an implementation of current spike reduction in battery charging devices in one embodiment. Under a linear control 220 shown in FIG. 2C, in response to a need to activate trickle charge mode, controller 108 can set reference voltage 120 to intermediate voltage 154, then apply a linear filter to reduce reference voltage 120 to minVsys 127 at predefined slew rate 156. Under a resistor-capacitor (RC) control 230 shown in FIG. 2D, in response to a need to activate trickle charge mode, controller 108 can set reference voltage 120 to intermediate voltage 154, then apply a RC filter to reduce reference voltage 120 to minVsys 127 at predefined slew rate 156.

Figure 3:
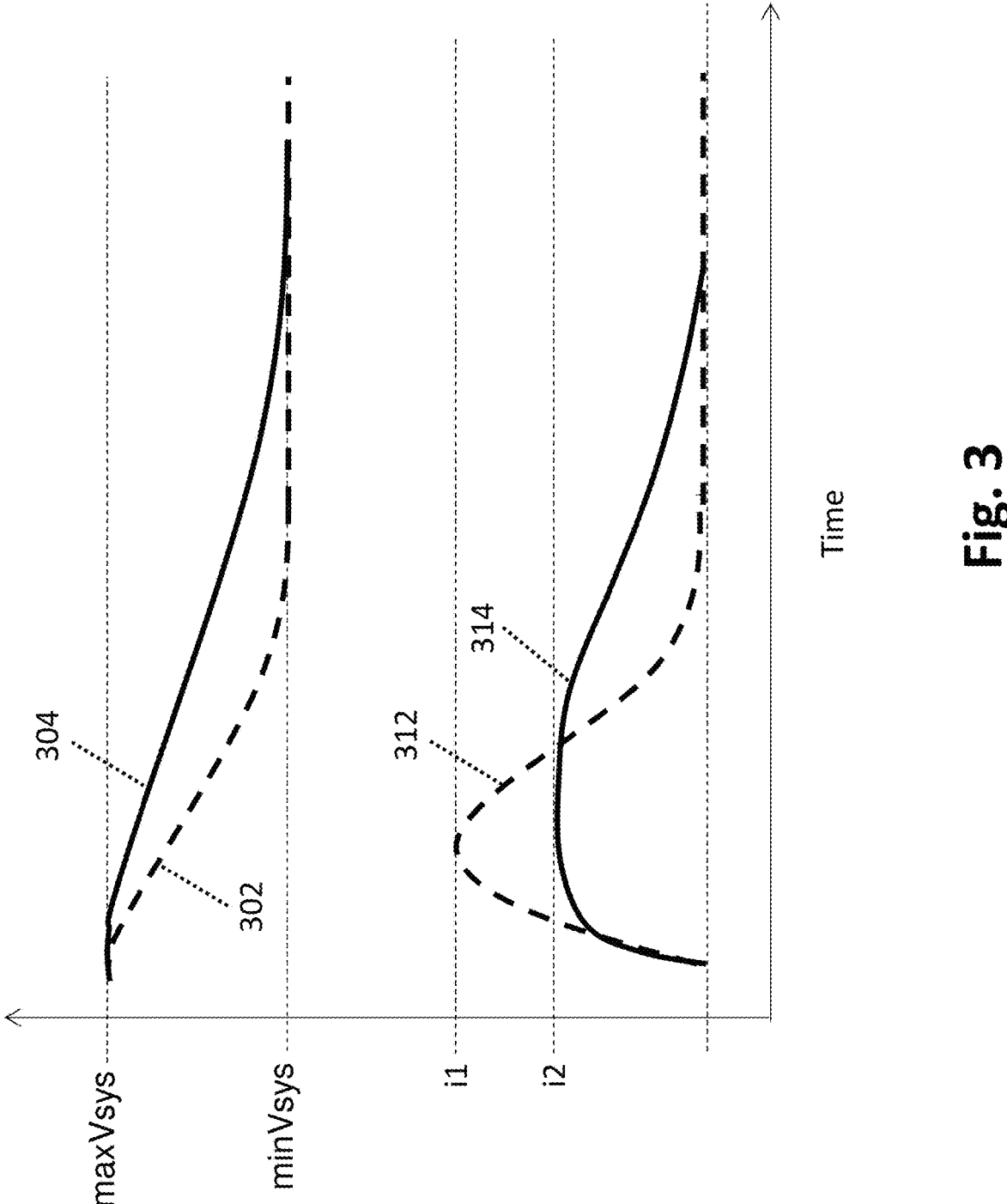
FIG. 3 is a diagram illustrating an example result from an implementation of current spike reduction in battery charging devices in one embodiment.

FIG. 3 is a diagram illustrating an example result from an implementation of current spike reduction in battery charging devices in one embodiment. In an example shown in FIG. 3, a waveform 302 shows a scenario where controller 108 reduces VBUS directly from max Vsys to minVsys. The direct reduction from max Vsys to minVsys can lead to a voltage spike having a current i1 to battery 106, as shown by a waveform 312. Another waveform 304 shows a scenario where controller 108 reduces VBUS gradually, in a slower manner, from max Vsys to minVsys. The gradual reduction from max Vsys to minVsys can lead to a voltage spike having a current i2 to battery 106, as shown by a waveform 314. Therefore, by slowing down the regulation of VBUS from max Vsys to minVsys, the amount of current spike going to battery 106 can be reduced.

Figure 4:
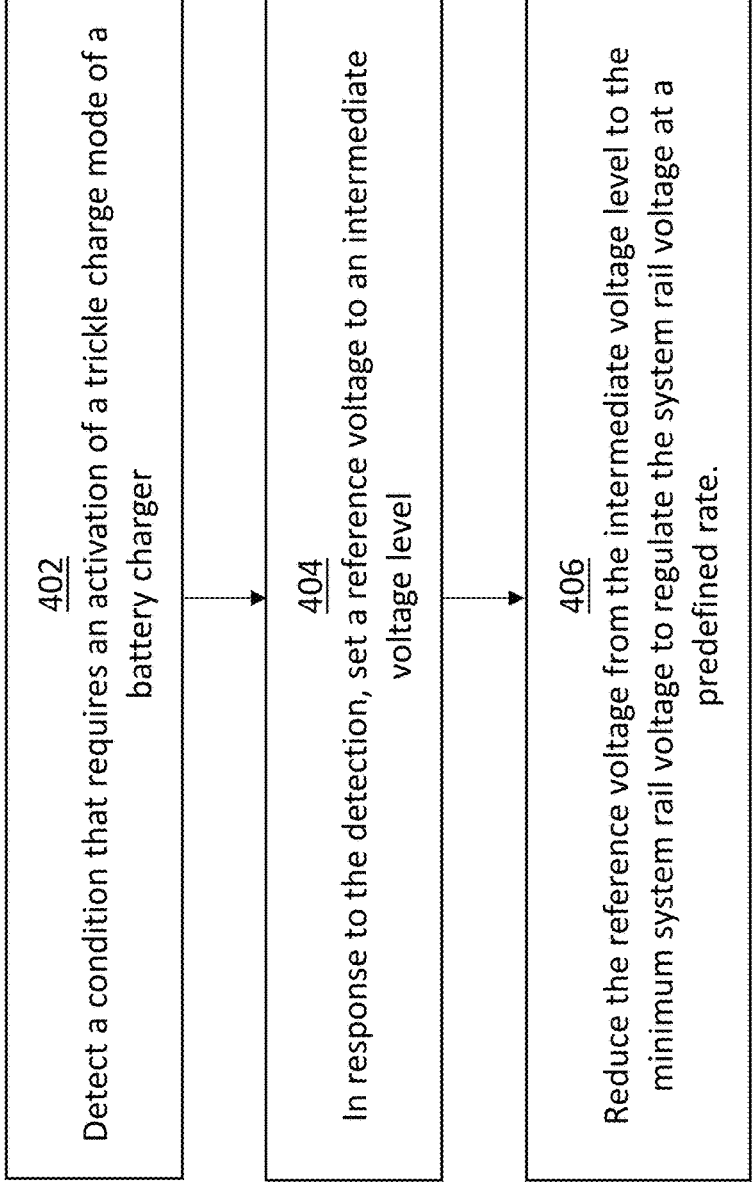
FIG. 4 is a flowchart of an example process that may implement current spike reduction in battery charging devices according to an embodiment of the disclosure.

FIG. 4 is a flowchart of an example process 400 that may implement current spike reduction in battery charging devices according to an embodiment of the disclosure. Process 400 can be performed by a controller of a battery charger to regulate a system rail voltage of the battery charger. Process 400 can begin at block 402. At block 402, the controller can detect a condition that requires an activation of a trickle charge mode of a battery charger.

Process 400 can proceed from block 402 to block 404. At block 404, in response to the detection, the controller can set a reference voltage to an intermediate voltage level. The reference voltage can control a system rail voltage of the battery charger, and the intermediate voltage level can be greater than a minimum of the system rail voltage.

Process 400 can proceed from block 404 to block 406. At block 406, the controller can reduce the reference voltage from the intermediate voltage level to the minimum system rail voltage to regulate the system rail voltage at a predefined rate. In one embodiment, the reduction of the reference voltage from the intermediate voltage level to the minimum system rail voltage can cause a reduction of a current spike flowing into a battery being charged by the battery charger.

In one embodiment, reducing the reference voltage from the intermediate voltage level to the minimum system rail voltage can include reducing the reference voltage from the intermediate voltage level to another intermediate voltage level, and reducing the reference voltage from said another intermediate voltage level to the minimum system rail voltage. In one embodiment, the controller can apply a linear filter to reduce the reference voltage from the intermediate voltage level to the minimum system rail voltage. In one embodiment, the controller can apply a resistor-capacitor (RC) filter to reduce the reference voltage from the intermediate voltage level to the minimum system rail voltage.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present disclosure have been presented for purposes of illustration and description but are not intended to be exhaustive or limited to the disclosure in the forms disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An apparatus comprising:
   an integrated circuit configured to:
   detect a condition that requires an activation of a trickle charge mode of a battery charger, wherein the condition is a detection of a battery voltage being less than a minimum system rail voltage of the battery charger;
   in response to the detection, set a reference voltage to an intermediate voltage level, wherein the reference voltage controls a system rail voltage of the battery charger, and the intermediate voltage level is greater than the minimum system rail voltage; and
   reduce the reference voltage, at a predefined rate, from the intermediate voltage level to the minimum system rail voltage to regulate the system rail voltage to match the reference voltage, wherein reduction of the reference voltage is performed until the reference voltage reaches the minimum system rail voltage.

2. The apparatus of claim 1, wherein the reduction of the reference voltage from the intermediate voltage level to the minimum system rail voltage reduces a current spike flowing into a battery being charged by the battery charger.

3. The apparatus of claim 1, wherein the integrated circuit is configured to:
   reduce the reference voltage from the intermediate voltage level to another intermediate voltage level; and
   reduce the reference voltage from said another intermediate voltage level to the minimum system rail voltage.

4. The apparatus of claim 1, wherein the integrated circuit is configured to apply a linear filter to reduce the reference voltage from the intermediate voltage level to the minimum system rail voltage at a predetermined slew rate.

5. The apparatus of claim 1, wherein the intermediate voltage is less than a maximum of the system rail voltage.

6. The apparatus of claim 1, wherein the integrated circuit further comprises:
   a voltage divider configured to divide the system rail voltage to generated a divided voltage; and
   a comparator configured to:
   compare the divided voltage with a scaled version of the reference voltage; and
   output a signal that indicates an amount of adjustment to the system rail voltage for regulating the system rail voltage to match the reference voltage.

7. The apparatus of claim 6, wherein the integrated circuit is configured to generate the scaled version of the reference voltage by dividing the reference voltage by a factor that is based on resistance values of at least one resistors that formed the voltage divider.

8. The apparatus of claim 1, wherein:

the integrated circuit further comprises a register configured to store a digital value of the intermediate voltage level; and the integrated circuit is configured to input the digital value to a digital-to-analog converter (DAC) to set the reference voltage to the intermediate voltage level.

9. A system comprising:

a power stage; and a battery charging module connected to the power stage, the battery charging module comprises a controller configured to:

control the power stage to output a system rail voltage;

detect a condition that requires an activation of a trickle charge mode of battery charging module, wherein the condition is a detection of a battery voltage being less than a minimum system rail voltage;

in response to the detection, set a reference voltage to an intermediate voltage level, wherein the reference voltage controls the system rail voltage of the battery charging module, and the intermediate voltage level is greater than the minimum system rail voltage; and reduce the reference voltage, at a predefined rate, from the intermediate voltage level to the minimum system rail voltage to regulate the system rail voltage to match the reference voltage, wherein reduction of the reference voltage is performed until the reference voltage reaches the minimum system rail voltage.

10. The system of claim 9, wherein the reduction of the reference voltage from the intermediate voltage level to the minimum system rail voltage reduces a current spike flowing into a battery being charged by the battery charging module.

11. The system of claim 8, wherein the controller is configured to:

reduce the reference voltage from the intermediate voltage level to another intermediate voltage level; and reduce the reference voltage from said another intermediate voltage level to the minimum system rail voltage.

12. The system of claim 8, wherein the controller is configured to apply a linear filter to reduce the reference voltage from the intermediate voltage level to the minimum system rail voltage at a predetermined slew rate.

13. The system of claim 9, wherein the intermediate voltage is less than a maximum system rail voltage.

14. The system of claim 9, further comprising a battery being charged by battery charging module.

15. A method for regulating a system rail voltage of a battery charger, the method comprising:

detecting a condition that requires an activation of a trickle charge mode of the battery charger, wherein the condition is a detection of a battery voltage being less than a minimum system rail voltage;

in response to the detection, setting a reference voltage to an intermediate voltage level, wherein the reference voltage controls a system rail voltage of the battery charger, and the intermediate voltage level is greater than the minimum system rail voltage; and reducing the reference voltage, at a predefined rate, from the intermediate voltage level to the minimum system rail voltage to regulate the system rail voltage to match the reference voltage, wherein reduction of the reference voltage is performed until the reference voltage reaches the minimum system rail voltage.

16. The method of claim 15, wherein the reduction of the reference voltage from the intermediate voltage level to the minimum system rail voltage reduces of a current spike flowing into a battery being charged by the battery charger.

17. The method of claim 15, wherein reducing the reference voltage from the intermediate voltage level to the minimum system rail voltage comprises:

reducing the reference voltage from the intermediate voltage level to another intermediate voltage level; and reducing the reference voltage from said another intermediate voltage level to the minimum system rail voltage.

18. The method of claim 15, further comprising applying a linear filter to reduce the reference voltage from the intermediate voltage level to the minimum system rail voltage at a predetermined slew rate.

* * * * *